US011604305B2

(12) United States Patent
Watson et al.

(10) Patent No.: US 11,604,305 B2
(45) Date of Patent: Mar. 14, 2023

(54) CLASSIFYING LAND USE USING SATELLITE TEMPERATURE DATA

(71) Applicant: International Business Machines Corporation, Armonk, NY (US)

(72) Inventors: Campbell D Watson, Brooklyn, NY (US); Mukul Tewari, Lafayette, CO (US); Lloyd A Treinish, Cortlandt Manor, NY (US); Eli Michael Dow, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/066,517

(22) Filed: Oct. 9, 2020

(65) Prior Publication Data
US 2022/0113448 A1    Apr. 14, 2022

(51) Int. Cl.
*G01W 1/10* (2006.01)
*G06N 20/00* (2019.01)

(52) U.S. Cl.
CPC .............. *G01W 1/10* (2013.01); *G06N 20/00* (2019.01)

(58) Field of Classification Search
CPC .................................. G01W 1/10; G06N 20/00
See application file for complete search history.

(56) References Cited

U.S. PATENT DOCUMENTS

| 7,702,597 | B2* | 4/2010 | Singh | G06Q 10/04 706/21 |
| 8,442,275 | B2* | 5/2013 | Antolin | G06K 9/0063 382/113 |
| 2015/0371115 | A1* | 12/2015 | Marchisio | G06K 9/4604 382/159 |
| 2018/0004807 | A1* | 1/2018 | Cohen | G06F 16/9535 |
| 2019/0057171 | A1* | 2/2019 | Qin | G06F 30/20 |
| 2019/0331832 | A1* | 10/2019 | Chandra | G06N 3/0454 |

FOREIGN PATENT DOCUMENTS

| CN | 107194504 A | | 9/2017 |
| CN | 108960300 A | * | 6/2018 |
| CN | 108960300 A | | 12/2018 |

OTHER PUBLICATIONS

Quesada et al, 5 algorithms to train a neural network, 2017.*
(Continued)

*Primary Examiner* — Alexander Satanovsky
*Assistant Examiner* — Lynda Dinh
(74) *Attorney, Agent, or Firm* — David K. Mattheis; Maeve Carpenter

(57) ABSTRACT

Classifying land use by receiving geographic data and land use data for a geographic area, receiving surface temperature data for the geographic area, mapping the geographic data and temperature data to a set of map grid cells, determining temperature statistics for each map grid cell, training a machine learning model according to the land use data and temperature statistics, and classifying land use for map grid cells of a different geographic area according to the machine learning model.

16 Claims, 4 Drawing Sheets

(56) References Cited

OTHER PUBLICATIONS

Aburas et al., "Spatio-temporal simulation and prediction of land-use change using conventional and machine learning models: a review", Environ Monit Assess (2019), pp. 191-205, Published online: Mar. 5, 2019, <https://doi.org/10.1007/s10661-019-7330-6>.

Bonafoni et al., "Land Surface Temperature and Urban Density: Multiyear Modeling and Relationship Analysis Using MODIS and Landsat Data", Remote Sensing 2018, 10, 1471, MDPI, Published: Sep. 14, 2018, 13 pages, doi:10.3390/rs10091471.

Fashae et al., "Land use/land cover change and land surface temperature of Ibadan and environs, Nigeria", Environ Monit Assess (2020), 192, 109, Published online: Jan. 13, 2020, <https://doi.org/10.1007/s10661-019-8054-3>.

Koc et al., "Determination of Relationship Between Land Surface Temperature and Different Land Use by Chaid Analysis", Applied Ecology and Environmental Research, 17(3), pp. 6051-6067, 2019, DOI: http://dx.doi.org/10.15666/aeer/1703_60516067.

Mell et al., "The NIST Definition of Cloud Computing", Recommendations of the National Institute of Standards and Technology, Special Publication 800-145, Sep. 2011, 7 pages.

Osborne et al., "Quantifying how landscape composition and configuration affect urban land surface temperatures using machine learning and neutral landscapes", Computers, Environment and Urban Systems 76, 2019, pp. 80-90, Available online Apr. 17, 2019, <https://doi.org/10.1016/j.compenvurbsys.2019.04.003>.

Thapa et al., "Urban mapping, accuracy, & image classification: A comparison of multiple approaches in Tsukuba City, Japan", Applied Geography 29, No. 1, 2009, pp. 135-144, doi:10.1016/j.apgeog.2008.08.001.

\* cited by examiner

CLASSIFYING LAND USE USING SATELLITE TEMPERATURE DATA

BACKGROUND

The disclosure relates generally to the classifying of levels of land use. The disclosure relates particularly to using satellite temperature data to classify land use development levels for forecasting.

Computer models for weather and climate forecasting may utilize land use data. The land use data may be classified as agricultural, forest, low-intensity residential, high-intensity residential, and commercial use.

Spacecraft like Aqua and Terra operated by the National Aeronautics and Space Administration (NASA), have instrumentation that collect a wide range of remotely sensed data over decades regarding the earth's surface.

Existing databases of land use are incomplete in the scope of their coverage in terms of geographic areas. These data bases are also of varied data quality and not always up to date. Visible image data may be used to indicate land use boundaries but lack sufficient details for land use classification. For example, relative building heights may not be determined from visible images. Building material types impact local temperatures and are not necessarily discernible from visible images. The variations in diurnal temperatures in urban areas may be affected by landscape details, which vary on a building by building, lot by lot basis. Accurately accounting for these variances through the use of high-resolution temperature data enables the generation of weather and climate models having a corresponding higher degree of accuracy in their predictions. On-going urbanization and renovation require up-to-date models to maintain forecast accuracy over time.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable classification of development density levels.

Aspects of the invention disclose methods, systems and computer readable media associated with classifying land use by receiving geographic data and land use data for a geographic area, receiving surface temperature data for the geographic area, mapping the geographic data and temperature data to a set of map grid cells, determining temperature statistics for each map grid cell, training a machine learning model according to the land use data and temperature statistics, and classifying land use for map grid cells of a different geographic area according to the machine learning model. By training a machine learning classification model using high resolution surface temperature data in combination with labeled geographic land use data, disclosed embodiments enable the use of the trained model to analyze and classify the land use of geographic areas which lack accurate land use data. The trained model analyzes the area's geography and overlays surface temperature data, analyzes the combination using the trained model and classifies the land use of the area. This classification enables the generation of more accurate weather and climate predictions since surface heating affects the characteristics of the lower atmosphere.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
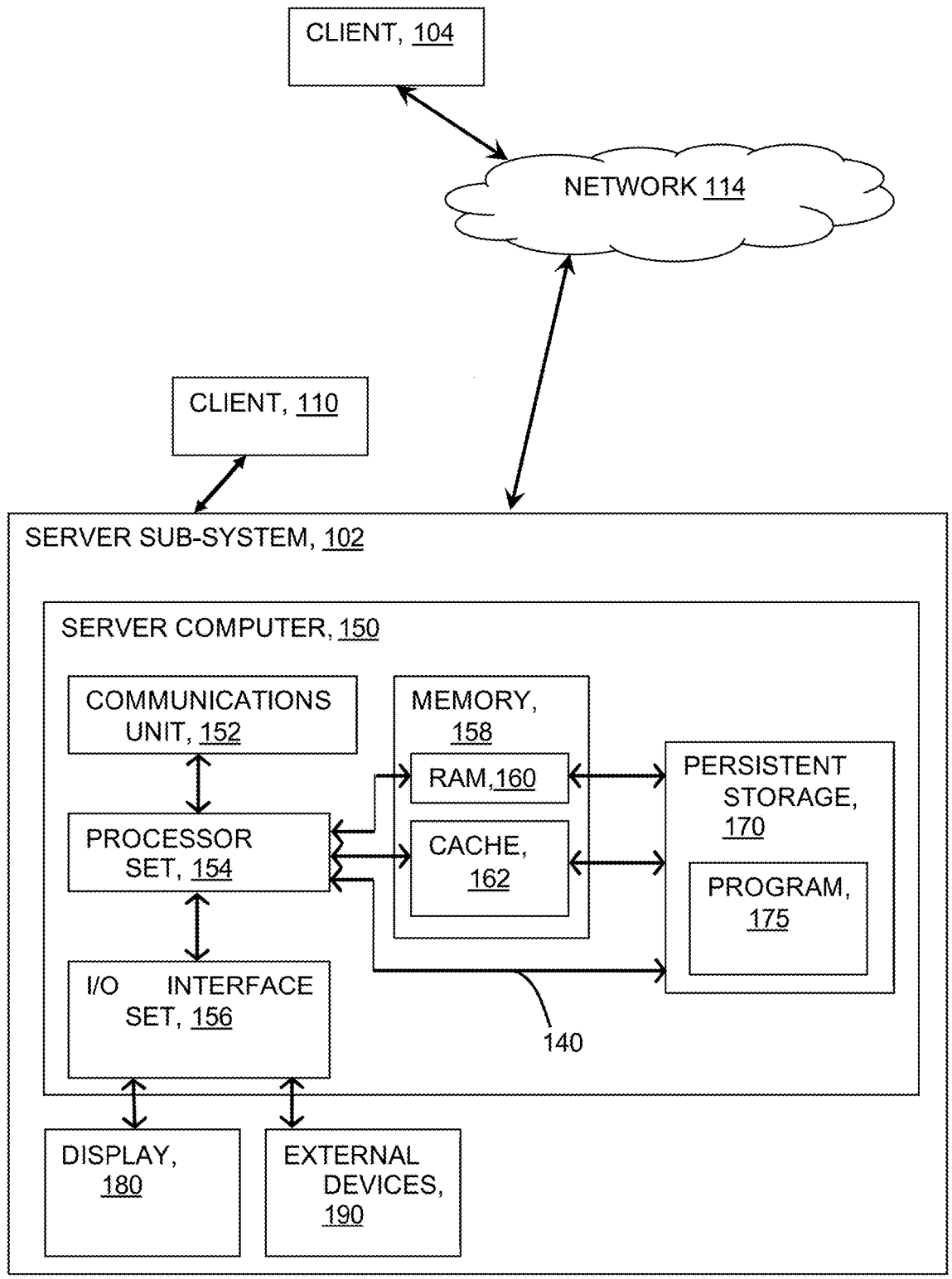
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., training a machine learning model using geographic data, land use data and surface temperature data, classifying land use according to the trained model, etc.). These solutions are not abstract and cannot be performed as a set of mental acts by a human due to the processing capabilities needed to facilitate land use classification, for example. Further, some of the processes performed may be performed by a specialized computer for carrying out defined tasks related to land use classification. For example, a specialized computer can be employed to carry out tasks related to classification of land use or the like.

Local surface heating contributes to local weather as well as to overall climate. Surface conditions relate directly to surface heating. Rural land heats and reflects energy from the sun differently than urban land. Even among urban land different uses of the land, low density residential areas, high density residential areas, and commercial areas, absorb, release, and reflect energy differently. Accounting for these differences at a high level of spatial resolution enables more accurate weather and climate forecasts than broadly generalizing land uses. By training a machine learning classification model with labeled land use data, disclosed embodiments enable the classification of the land use of geographic areas lacking up-to-date land use data.

In an embodiment, the method receives geographic data associated with a selected area. The geographic data may include land use categories for the portions of the area, such as data from the National Land Cover Database (NLCD). The geographic data may include natural and political boundaries, watershed data, transportation infrastructure data, etc. The land use data may include a current categorization of the land use as developed, barren, forest, cultivated, etc. The NLCD includes land use data categorizations at a resolution of 30 meters and 16 different land use categorizations including open, low, medium, and high intensity developed areas—urban characterizations. Singapore represents something of an outlier as it has no low intensity development areas. It only has high intensity developed areas surrounded by the ocean.

In this embodiment, the method further receives surface temperature data associated with the same selected area. The method may receive surface temperature data originating from a spacecraft, such as the Geostationary Operational Environmental Satellites (GOES), or from Landsat satellites. The surface temperature data may include a temperature estimate around the clock for an extended period of time, months, years, or longer, for the selected area. The satellite data may include data having a spatial resolution of 30 meters or temporal resolution of tens of minutes. The data may include measurements during the daytime and nighttime for the selected area. Data having coarser resolution may be downscaled to enhance the resolution of the original data.

In an embodiment, the method overlays the geographic data, including the land use labelling, and the surface temperature data on a common map grid consisting of an array of map grid cells corresponding to the selected geographic area. Overlaying the geographic data set and the temperature data set provides a spatial correlation between the data of the two sets. The data sets may be overlaid with a common grid having a resolution similar to that of the data sets, finer than the data sets to capture details produced by an imperfect of the two sets, or coarser than the data sets to smooth the data. Large geographic area may cross multiple climate zones and climate classification, such as the Koppen Climate zones, whose characterizations may be added to the data for each map grid cell.

In an embodiment, the method analyzes the surface temperature data sets in terms of each mapped grid cell. The method determines temperature statistics, including the mean, median, and standard deviation for the distribution of temperature data associated with each map grid cell. The method determines sets of statistics for daytime and nighttime periods for each map cell.

The method trains a machine learning classification model, such as a recurrent neural network, or convolutional neural network, to classify map grid cells according to the temperature statistics of each cell. The method utilizes the combination of ground truth land use labels for each cell and the temperature statistics determined for each cell to train the model by minimizing a model loss function for neural network node weight values which accurately associate temperature statistics for each map grid cell of the set of cells, with the correct ground truth label for each cell. Minimizing the loss function implies minimizing the difference between the neural network predictions for map cell land use labels and the provided ground truth labels for the cells. The method stores the set of neural network node weights associated with the minimization of the loss function of the model as the trained model.

In an embodiment, the method applies the trained model to the data sets associated with the selected geographic area to yield a land use mapping for the area. On-going use of the trained model with temperature data for the originally selected geographic area yields a land use map which is current long after the original land use ground truth labels have become inaccurate. In this embodiment, the method may further include data such as surface albedo and emissivity, population data, air pollution data, visible imagery data, night time lighting data, infra-red imagery, normalized difference vegetation index data, and terrain data for the selected area to further refine the mapping of the selected area as well as the node weightings of the model. In this embodiment, the addition of these data sets yields a model requiring corresponding additional data sets for any selected geographic area as input values to effectively utilize the refined node weightings. Effective use of a model trained using only land use labels and associated temperature statistics data requires only an input set including corresponding temperature data.

In an embodiment, the method ranks the set of map grid cells according to a relative scaling, such as ranking the cells from coolest cell to warmest cell. In this embodiment, the method classifies each cell's degree of development intensity by categorizing the set into development intensity according to intensity thresholds applied to the set of ranked cells. Cells falling below—cooler—than the low intensity threshold are labeled as low intensity, those between the low intensity threshold and medium intensity threshold are labeled as medium intensity, and those above the medium intensity threshold are labeled as high intensity development areas. In this embodiment, the method utilizes the ground truth labels of the labeled land use data to establish the thresholds.

In an embodiment, the method trains a machine learning model such as a random forest, boosted trees model, convolutional neural network, recurrent neural network, or generative adversarial network to classify land use according to the rankings.

In an embodiment, the method applies the trained machine learning classification model to geographic areas selected for land use analysis, which lack a corresponding set of land use labels. The trained model analyses temperature data for the selected area and classifies the land use of the set of map grid cells of the area. The method yields a land use mapping of the geographic area.

In an embodiment, the land use mapping includes an indication of the ranking of the map grid cells such as a visual indication using different colors for different cell rankings on the map.

In an embodiment, the land use mappings of the selected geographic areas serve as input data to weather forecasting models by providing more accurate mappings of the surface conditions for the forecasting model. The mappings enable more accurate use of urban canopy portions of the forecasting models, improving the forecasts for the urban areas as well as those areas adjacent to the urban areas. The output mappings also serve as input data for climate modeling programs analyzing the relevant geographic areas in the same manner. Accurate land use mapping may further provide inputs to air quality, resource utilization, transportation planning, energy usage and other environmental models.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise land use classification program (not shown) together with sufficient computing resource (processor, memory, network communications hardware) to execute the program. Devices 104 and 110 may function as user input devices for a user of the program. These devices enable the user to access the program, selects geographic areas, import data sets, and review and export output mappings from the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the land use classification program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., land use classification program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
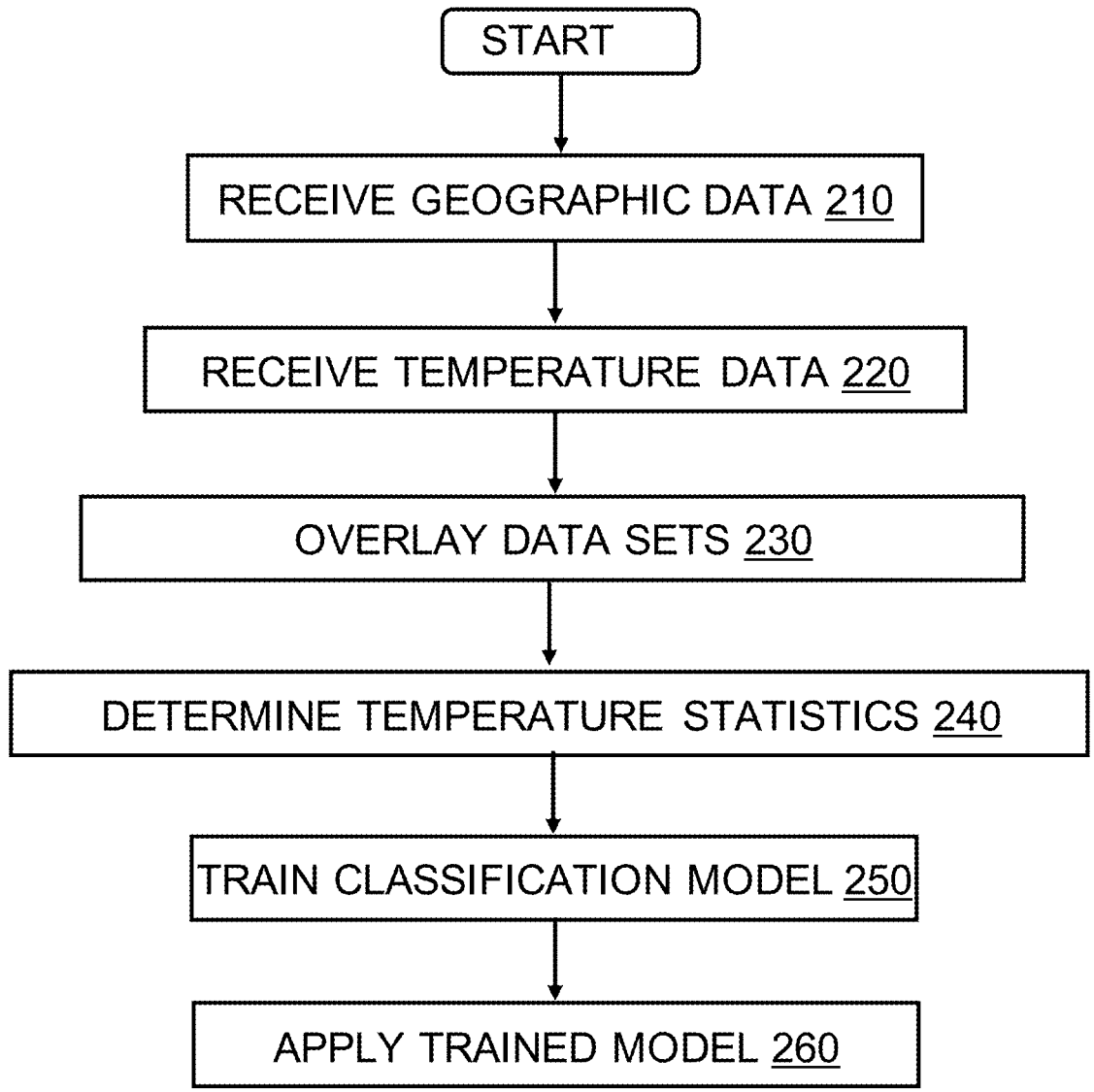
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of land use classification program 175, receives geographic data associated with a selected area. The data may include geographic and political boundaries, transportation infrastructure, watershed information and ground truth labels for land use of the respective portions of the geographic area. Land cover data, such as that available from the National Land Cover Database, may be provided to the method.

At block 220, the method of land use classification program 175 receives surface temperature data for the selected geographic area. Surface temperature data may be provided from a source such as the Landsat or GOES satellites. The surface temperature data may include periodic data points collected over an extended period of time—such as a year—for the area. The data may include both daytime and nighttime measurements of the surface temperatures for the selected area.

At block 230, the method of land use classification program overlays the land use/geographic and surface temperature data sets on a common map grid. The overlay comprises a set of map grid cells corresponding to the area. Each cell having a land use ground truth label and an associated surface temperature data set for the monitored time period. In an embodiment, the method overlays and registers the land use and surface temperature data against common geographic benchmarks. This overlay may yield data features having a finer degree of spatial resolution than either of the original data sets. Such an embodiment produces a final land use mapping having a finer spatial resolution than the original data sets.

At block 240, the method determines surface temperature statistics of the data distributions associated with each grid cell of the mapping overlay. The method determines a mean and median temperature for the cell as well a maximum temperature, minimum temperature, and the standard deviation for the distribution.

At block 250, the method of land use classification program 175 trains a machine learning model such as a recurrent neural network a random forest, a convolutional neural network, a generative adversarial network, or other classification model. In an embodiment, the method utilizes a back-propagation gradient descent algorithm to minimize a loss function associated a model land use prediction for a map grid cell and the ground truth label for the cell. The method minimizes the loss function for the prediction ground truth label across the set of mapped grid cells. The method achieves the loss function minimization by adjusting the network node weights associated with correct and incorrect network land use predictions. The final set of network node weights—those weights associated with the minimum value of the loss function for the set of grid cells—represents the node weights for the trained model. This set of weights provides the highest probability—model certainty—for accurately predicting lad use from temperature data.

At block 260, the method of land use classification program applies the trained model from block 250, to surface temperature data associated with a selected geographic area. The selected area may be original area utilized for training the model or may be a new geographic area for which, land use labels are unavailable. Application of the model to the temperature data yields a mapping of land use of the selected geographic area.

In an embodiment, a more refined model may be trained by the addition of supplemental data sets including population data, air quality—air pollution data, albedo-emissivity data, visible imagery data, night time lighting data, infra-red imagery, normalized difference vegetation index data, and terrain data to the training process. In this embodiment, the model learns to associate data from all provided data sets with the correct ground truth land use label. Any combination of the described data sets may be used in the training. The trained model effectiveness relates directly to the quality and completeness of the corresponding data sets for the geographic are being analyzed. Land use mapping will be less effective when suing such a sophisticated model without the full set of corresponding data sets for the target geographic area.

Application of the trained model provides a mapping of the land use of the target area. The output mapping serves as an input to weather, climate, planning and development, and other forecasting models.

Effective implementation of disclosed methods may require computing resources in excess of those available locally to a user of the disclosed embodiments. Access to and usage of edge or cloud computing resource may enable more effective implementation and use of the disclosed embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
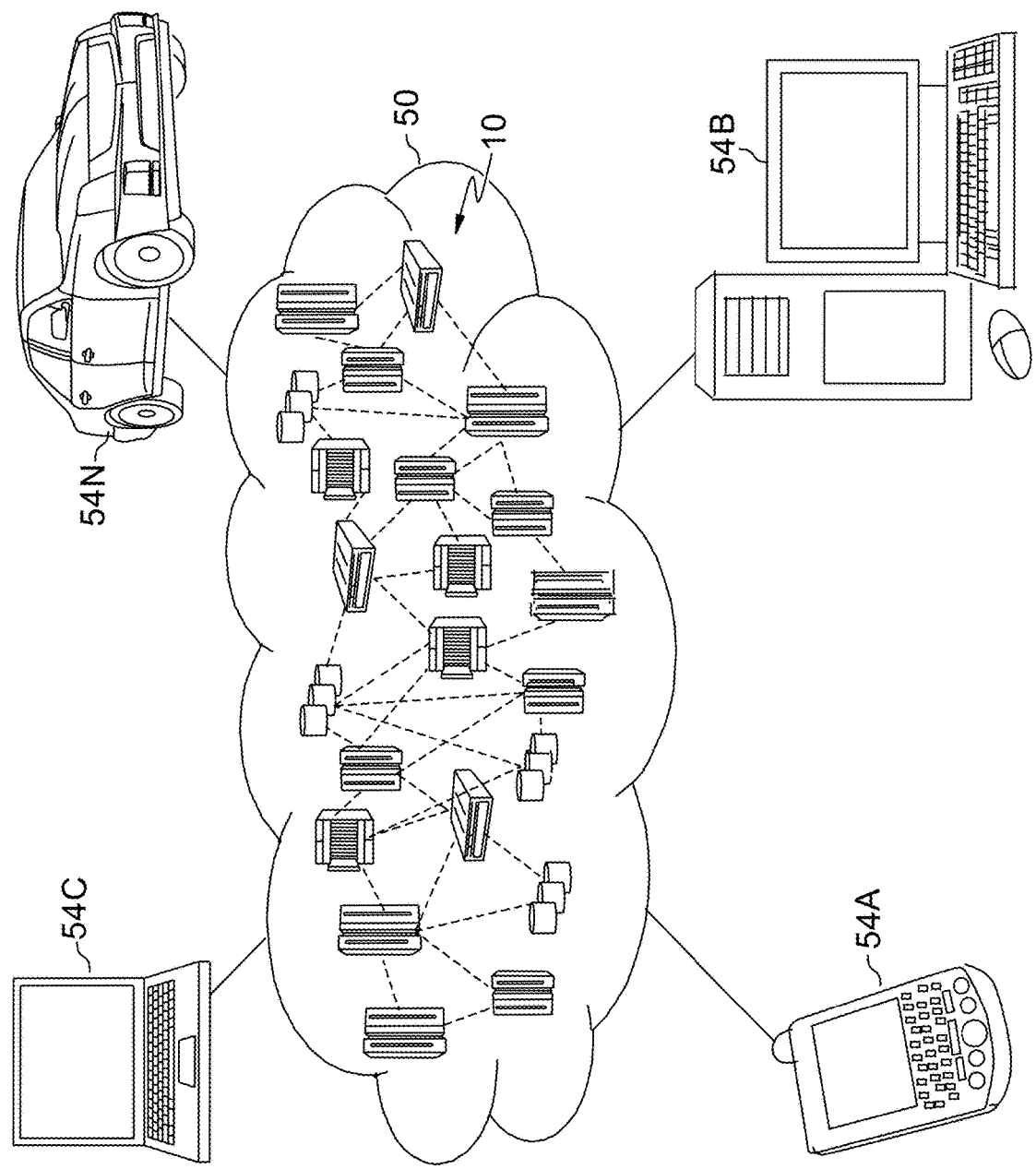
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
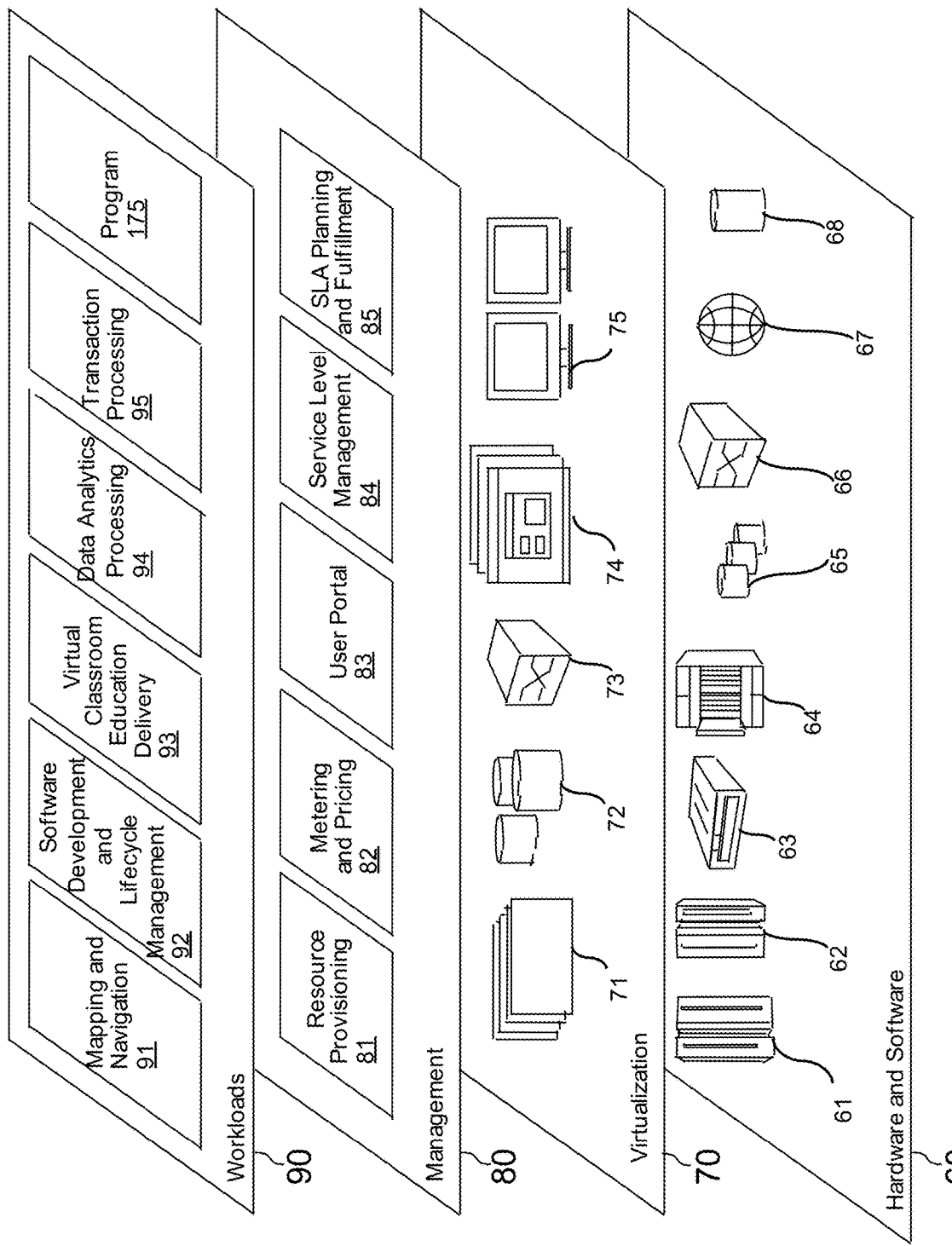
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and land use classification program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for classifying land use, the method comprising:

receiving, by one or more computer processors, geographic data and land use data for a first geographic area;

receiving, by the one or more computer processors, surface temperature data for the first geographic area;

mapping, by the one or more computer processors, the geographic data and temperature data to a first set of map grid cells;

determining, by the one or more computer processors, temperature statistics for each map grid cell of the first set of map grid cells according to the surface temperature data;

training, by the one or more computer processors, a machine learning model according to the land use data and the temperature statistics, wherein the training comprises minimizing a loss function for neural network node weight values which accurately associate the land use data and the temperature statistics;

receiving, by one or more computer processors, geographic data for a second geographic area receiving, by the one or more computer processors, surface temperature data for a second geographic area;

mapping, by the one or more computer processors, the geographic data for the second geographic area and the surface temperature data for the second geographic area to a second set of map grid cells;

determining, by the one or more computer processors, temperature statistics for each map grid cell of the second set of map grid cells according to the surface temperature data;

classifying, by the one or more computer processors, land use for the map grid cells of the second geographic area using the machine learning model and the temperature statistics for each of the map grid cells of the second geographic area, wherein the second geographic area lacks land use data; and generating, by the one or more computer processors, a land use map for the second geographic area according to the map grid cells of the second geographic area and providing the land use map of the second geographic area.

2. The computer implemented method according to claim 1, further comprising:

training, by the one or more computer processors, the machine learning model according to population data associated with the first geographic area.

3. The computer implemented method according to claim 1, further comprising:

training, by the one or more computer processors, the machine learning model according to physical data associated with the first geographic area.

4. The computer implemented method according to claim 1, further comprising generating, by the one or more computer processors, a weather forecasting model according to the land use map of the second geographic area.

5. The computer implemented method according to claim 1, further comprising:

ranking, by the one or more computer processors, the map grid cells of the second geographic area according to temperature statistics of the second geographic area; and providing, by the one or more computer processors, an indication of the map grid cells of the second geographic area rankings as part of the land use map of the second geographic area.

6. The computer implemented method according to claim 1, further comprising:

ranking, by the one or more computer processors, the map grid cells of the second geographic area according to temperature statistics of the map grid cells of the second geographic area;

generating, by the one or more computer processors, the land use map for the second geographic area according to the machine learning model; and providing, by the one or more computer processors, an indication of the map grid cells of the second geographic area rankings as part of the land use map of the second geographic area.

7. A computer program product for classifying land use, the computer program product comprising one or more computer readable storage devices and collectively stored program instructions on the one or more computer readable storage devices, the stored program instructions comprising:

program instructions to receive geographic data and land use data for a first geographic area;

program instructions to receive surface temperature data for the first geographic area;

program instructions to map the geographic data and temperature data to a set of map grid cells;

program instructions to determine temperature statistics for each map grid cell according to the surface temperature data;

program instructions to train a machine learning model according to the land use data and the temperature statistics, wherein the training comprises minimizing a loss function for neural network node weight values which accurately associate the land use data and the temperature statistics;

program instructions to receive geographic data for a second geographic area program instructions to receive surface temperature data for a second geographic area;

program instructions to map the geographic data for the second geographic area and the surface temperature data for the second geographic area to a second set of map grid cells;

program instructions to determine temperature statistics for each map grid cell of the second set of map grid cells according to the surface temperature data;

program instructions to classify land use for the map grid cells of the second geographic area, using the machine learning model and the temperature statistics for each of the map grid cells of the second geographic area, wherein the second geographic area lacks land use data;

program instructions to generate a land use map for the second geographic area according to the machine learning model; and program instructions to provide the land use map of the second geographic area.

8. The computer program product according to claim 7, the stored program instructions further comprising:

program instructions to train the machine learning model according to population data associated with the first geographic area.

9. The computer program product according to claim 7, the stored program instructions further comprising:

program instructions to train the machine learning model according to physical data associated with the first geographic area.

10. The computer program product according to claim 7, the stored program instructions further comprising program instructions to generate a weather forecasting model according to the land use map of the second geographic area.

11. The computer program product according to claim 7, the stored program instructions further comprising:

program instructions to rank the map grid cells of the second geographic area according to temperature statistics for the map grid cells of the second geographic area; and program instructions to provide an indication of the map grid cells of the of the second geographic area rankings as part of the land use map of the second geographic area.

12. The computer program product according to claim 7, the stored program instructions further comprising:

program instructions to rank the map grid cells of the second geographic area according to temperature statistics for the map grid cells of the second geographic area;

program instructions to generate the land use map for the second geographic area according to the machine learning model; and program instructions to provide an indication of the map grid cells of the second geographic area rankings as part of the land use map of the second geographic area.

13. A computer system for classifying land use, the computer system comprising:

one or more computer processors;

one or more computer readable storage devices; and stored program instructions on the one or more computer readable storage devices for execution by the one or more computer processors, the stored program instructions comprising:
  program instructions to receive geographic data and land use data for a first geographic area;
  program instructions to receive surface temperature data for the first geographic area;
  program instructions to map the geographic data and temperature data to a set of map grid cells;
  program instructions to determine temperature statistics for each map grid cell according to the surface temperature data;
  program instructions to train a machine learning model according to the land use data and the temperature statistics, wherein the training comprises minimizing a loss function for neural network node weight values which accurately associate the land use data and the temperature statistics;
  program instructions to receive geographic data for a second geographic area
  program instructions to receive surface temperature data for a second geographic area;
  program instructions to map the geographic data for the second geographic area and the surface temperature data for the second geographic area to a second set of map grid cells;
  program instructions to determine temperature statistics for each map grid cell of the second set of map grid cells according to the surface temperature data;
  program instructions to classify land use for the map grid cells of the second geographic area, using the machine learning model and the temperature statistics for each of the map grid cells of the second geographic area, wherein the second geographic area lacks land use data;
  program instructions to classify land use for map grid cells of a second geographic area according to the machine learning model;
  program instructions to generate a land use map for the second geographic area using the machine learning model, wherein the second geographic area lacks land use data; and
  program instructions to provide an output mapping of the land use classifications of the second geographic area.

14. The computer system according to claim 13, the stored program instructions further comprising:
  program instructions to train the machine learning model according to population data associated with the first geographic area.

15. The computer system according to claim 13, the stored program instructions further comprising:
  program instructions to train the machine learning model according to physical data associated with the first geographic area.

16. The computer system according to claim 13, the stored program instructions further comprising:
  program instructions to rank the map grid cells of the second geographic area according to the temperature statistics; and
  program instructions to provide an indication of the map grid cell ranking as part of the land use map of the second geographic area.

\* \* \* \* \*